Patented May 26, 1931

1,806,876

UNITED STATES PATENT OFFICE

DENISON W. GRANT, OF FRANKLIN, PENNSYLVANIA

METHOD OF FILTERING AND DECOLORIZING OILS

No Drawing. Continuation of application Serial No. 230,691, filed November 2, 1927. This application filed June 23, 1930. Serial No. 463,359.

This invention relates to a method of filtering or decolorizing oils, and more particularly the residual oils from the distillation of crude petroleum or similar liquids from any suitable source, and is of special utility when it is desired that the final product of the filtration or decolorization be a mixture of such filtered or decolorized oil and a suitable solvent. This application is a continuation of my application Serial No. 230,691, filed November 2, 1927, for method of filtering and decolorizing oils. This invention is especially well adapted to the filtration or decolorization of that class of residual oils from petroleum known to the trade as long residuum oils or cylinder stocks.

Filtration processes as heretofore commonly employed in the oil refining industry have been described in various publications, as "American Petroleum Refining", by Bell, at page 245, et seq., of the 1923 edition, and "American Petroleum Industry", by Bacon and Hamor, at page 652, et seq., of the 1920 edition, and for the sake of brevity, reference is made thereto. In the performance of the processes now commonly used, "off color" and "washout" oils are produced. "Off color" oils are filtered oils which are darker than the desired color but lighter than the virgin oil, and according to the practice and prior processes, although their production represents a loss of time and handling, they are purposely obtained and used in the next filter to make the first yield of that filter light in color; "wash out" oils are oils salvaged in filtering, washing and steaming of the fuller's earth during the process of reclaiming or reconditioning the filtering material, and are more difficult to filter than the virgin oil.

It is an object of this invention to provide a method of filtering or decolorizing oil whereby little or no "off color", or partially decolorized, or "wash out" oils are produced for reworking, with a resultant reduction in the handling of the oil and in the cost of processing.

Another object of this invention is to provide a process of filtering or decolorizing oil whereby there is obtained a maximum recovery of decolorized oil and solvent in a given time or cycle of filter operation, with the minimum production of "off color" and "wash out" oils incident to such operation.

Another object of this invention is to provide a process for filtering or decolorizing oil which, as compared with those heretofore employed, effects a very material saving of time and labor both in the period of operation and in the handling of the oil, with the consequent increase of product and a reduction in the cost of operation.

Another object of this invention is to provide a process of filtering or decolorizing oil which eliminates certain waste products heretofore commonly produced.

Another object of this invention is to provide a process for filtering or decolorizing oil which leaves the filtering material in a condition in which it may be readily reclaimed for further use, and which particularly avoids the necessity for repeated steaming and flushing of the filtering material.

Another object of this invention is to provide a process of filtering or decolorizing oil does not require the use of specialized apparatus, which may employ relatively coarse filtering materials, and which does not require agitation of the oil and filtering material.

Other objects will appear as the description of the invention proceeds.

In practicing the invention any usual or suitable form or type of filter may be employed, the present invention enabling the use of apparatus already installed without the provision of specialized equipment in order to practice the process.

In carrying out the method of this invention any suitable container for filtering material, as a stationary container, is charged nearly full with any suitable filtering material, such as fuller's earth. Into the filter thus charged the virgin oil to be filtered is introduced in such quantity that when the oil is flushed therefrom with petroleum spirit or gasoline or naphtha substantially the entire body of oil will have the desired color and there will be a minimum quantity of oil not decolorized to the desired extent. The quantity of oil subjected to the action of the filtering material may be predetermined before introduction into the filter in accordance with experience or laboratory test so as to be that quantity which will produce the desired color, or an excess of oil may be introduced into the container and then the excess withdrawn until a suitable color is indicated, or oil may be run into the filter until such time as the seepage therefrom indicates an appropriate color. But whether the quantity of oil to be processed is predetermined by experience or test or observationally determined by withdrawing the excess or introducing oil until the seepage indicates the appropriate color, the quantity of oil in the filter is controlled so as to be such a volume that the desired color will be produced in substantially the entire body of oil, with a minimum quantity of oil that has not been reduced to the desired color, when the oil is flushed from the filter.

The oil seeps into and through the filtering material, coming into intimate relatively stationary contact therewith, and this mixture of oil and filtering material is then permitted to stand intimately commingled in relatively stationary contact for such a period of time as shown by practice to produce the most efficient decolorization of the particular oil under treatment. The filter and its charge may be maintained at an elevated temperature if desired, and air pressure may be applied if desired, to facilitate the processing. Moreover, before the oil is introduced into contact with the filtering material, it may if desired be diluted with a suitable solvent, as petroleum spirit, as in ordinary practice.

At the expiration of the period during which the oil is permitted to remain in intimate contact with the filtering material, the oil is simultaneously drained from the filter and flushed therefrom with the desired solvent, preferably petroleum spirit, gasoline or naphtha. This flushing thoroughly cleans the filtering material, and after draining it is ready for steaming, roasting or any other suitable reclaiming process.

As distinguished from ordinary practice wherein more virgin oil is used to force the decolorized oil from the filter, thus leaving the filter filled with oil which must subsequently be recovered as "off color" and "wash out" oils, with the need for washing the filtering material, the process of the present invention provides that all or practically all of the oil flushed out of the filter is of the color previously decided upon, and thence this invention eliminates the handling of the qauntity of oil heretofore employed in forcing the decolorized oil from the filter, minimizes the production of "off color" oils, eliminates the production of the "wash out" oils that are difficult of decolorization, and saves time, labor and expense in the processing of the oil.

While this invention contemplates the treatment of any suitable oil, whether refined, semi-refined or crude, and whether undiluted or diluted with any suitable diluent agent, and at any suitable temperature, and the mixture of such oil with any suitable proportion of decolorizing granular material of any suitable degree of mesh or fineness, and any suitable degree of temperature, and permitting the absorptive action between the materials so utilized to continue for any suitable period of time, the following may be taken as two illustrations of specific instances of the application of the method of the present invention, the second example employing oil to which gasoline has been added:—

Into a filter of appropriate size, say twelve feet in height and nine feet in diameter, is charged two and one half tons of fuller's earth, ranging in degree of fineness from sixteen to sixty mesh and prepared in the usual way for decolorizing oil and at a suitable temperature, say 250° F. Twenty-five barrels of suitable steam refined petroleum oil, as Pennsylvania, Bradford grade, 600 cylinder stock, at approximately 100° F. is then charged into the filter. After a period of approximately four hours during which the oil is permitted to remain in stationary and intimate contact with the fuller's earth to permit the decolorizing action to take place, approximately thirty-seven barrels of petroleum spirit, gasoline or naphtha, is pumped through the filter at a suitable pressure, say fifteen pounds, to flush the oil from the earth in the filter, the spirit, gasoline or naphtha being preferably at a temperature of approximately 100° F. The oil so flushed from the filter may then be subjected to any desired further process of refining or other treatment. The fuller's earth may then be removed from the filter and reclaimed in the usual or any suitable way, as by use of steam and petroleum spirit, compressed air being sometimes also used.

As a second illustration:—

Into a filter of appropriate size, say twelve feet in height and nine feet in diameter, is charged two and one-half tons of fuller's earth, ranging in degree of fineness from sixteen to sixty mesh and prepared in the usual way for decolorizing oil and at a suitable temperature, say 150° F. Forty barrels of solution containing twenty-five barrels of suitable steam refined petroleum oil, as Pennsylvania, Bradford grade, 600 cylinder stock, and fifteen barrels of petroleum spirit, gasoline or naphtha, at approximately 100° F. is then charged into the filter. After the fuller's earth contained in the filter has become saturated with this solution, a period of approximately two hours during which the solution is permitted to remain in stationary and intimate contact with the fuller's earth to permit the decolorizing action to take place, approximately thirty-seven barrels of petroleum spirit, gasoline or naphtha is pumped through the filter at a suitable pressure, say fifteen pounds, to flush the solution from the earth in the filter, the spirit, gasoline or naphtha being preferably at a temperature of approximately 100° F. Approximately the last twenty barrels of spirit, gasoline or naphtha pumped into the filter will come out of the bottom of the filter containing no oil, the oil having been flushed out first. This last twenty barrels is kept separate and is used to dilute the virgin oil, in preparing the solution for the next filter. The filtered solution composed of the first forty barrels charged to the filter with the first seventeen barrels of straight spirit, gasoline or naphtha used in flushing out the solution from the filter and constituting a mixture containing about 40% oil and 60% spirit, gasoline or naphtha, may then be subjected to any desired further process of refining or other treatment. The fuller's earth may then be removed from the filter and reclaimed in the usual or any suitable way, as by use of steam and petroleum spirit, compressed air being sometimes also used.

In practicing the invention the quantity of oil or solution introduced into the filter may be that which substantially conforms with the absorptive capacity of the filtering material or it may be more or less than that amount, the excess being run off if more. Thus in the second illustration above given there may be a withdrawal of solution from the filter until a proper color is indicated or a predetermined amount is left in the filter.

My improved method of filtration very materially shortens the time heretofore employed in the filtration and decolorization of oils, the complete cycle as heretofore set out, including the preparation and regeneration of the fuller's earth, consuming approximately forty-six hours, as distinguished from the period of approximately seven days heretofore required. Hence the capacity of the equipment is nearly doubled, and the time, labor and expense of processing the oil materially reduced, while no undesirable waste products are formed, and there is little or no "off color" and "wash out" oils to be reprocessed. Moreover, the process requires no special appliances or devices and the filtering material used may be of relatively coarse grade, on the order of thirty mesh.

It will, therefore, be perceived that the present invention enables a more efficient use of any given filter equipment, because materially increasing the production of decolorized oil therefrom, while the amount of handling of the oil, and the time and labor expended in the processing of the oil, are materially reduced, so that there is a substantial saving in cost as well as increase of output.

While the invention has been described with considerable particularity, changes and modifications therein will now readily suggest themselves to those skilled in the art without departing from the spirit of this invention, and reference is therefore to be had to the appended claims for a definition of the invention. In the claims the term "petroleum spirit" will be used as generic to gasoline and naphtha.

What is claimed is:—

1. The method of decolorizing oil in a filter which includes the steps of charging a body of fuller's earth into the filter, causing said body of earth to remain stationary, charging such a quantity of oil into said body of earth that, upon subsequently flushing with petroleum spirit all the removed color producing bodies are retained by the earth, causing the oil to seep into the body of fuller's earth and remain therein and in contact therewith for a period of time sufficient to decolorize the oil, then flushing the oil from the earth with petroleum spirit, and then removing the spirit from the oil whereby the oil so produced is of the desired color.

2. The method of decolorizing oil which includes the steps of charging a filter with a body of filtering material, charging said body of filtering material with a quantity of oil in such relative proportions that substantially the entire body of oil therein when flushed therefrom with petroleum spirit will have the desired color and there will be a minimum quantity of oil not decolorized to the desired extent, retaining said oil and filtering material in intimate, relatively stationary contact for a sufficient period of time to cause the desired decolorizing of the oil to take place, and then flushing the oil from said filtering material with a suitable petroleum spirit.

3. The method of decolorizing oil which includes the steps of charging a filter with a body of fuller's earth, charging said body of fuller's earth with such a quantity of oil that when said oil is flushed from the fuller's earth with petroleum spirit the entire body of oil will have the desired color, permitting said oil to seep into and remain in intimate contact with said fuller's earth while stationary for a sufficient period of time to cause the desired absorption of color producing constituents by said body of fuller's earth, and then flushing the oil from said fuller's earth with petroleum spirit.

In testimony whereof I have signed this specification.

DENISON W. GRANT.